United States Patent [19]

Swann et al.

[11] Patent Number: 5,621,093

[45] Date of Patent: Apr. 15, 1997

[54] STEAM-STERILIZING SOLID HYALURONIC ACID

[75] Inventors: David A. Swann, Cambridge; Jing-wen Kuo, Wakefield; Vladimir Pinsky, Brighton, all of Mass.

[73] Assignee: Anika Research, Inc., Woburn, Mass.

[21] Appl. No.: 468,262

[22] Filed: Jun. 6, 1995

[51] Int. Cl.$^6$ .............................. C07H 5/06; C07H 13/02; C07H 1/06
[52] U.S. Cl. ..................... 536/55.2; 536/55.3; 536/119; 536/123.13; 536/127; 536/123.1
[58] Field of Search ................... 536/55.2, 55.3, 536/119, 123.1, 123.13, 127

[56] References Cited

U.S. PATENT DOCUMENTS

| | | | |
|---|---|---|---|
| 4,108,849 | 8/1978 | Thomas | 424/95 |
| 5,079,236 | 1/1992 | Drizen et al. | 514/54 |
| 5,128,321 | 7/1992 | Murray et al. | 514/12 |

FOREIGN PATENT DOCUMENTS

| | | |
|---|---|---|
| 0239335 | 9/1987 | European Pat. Off. . |
| 0459378 | 12/1991 | European Pat. Off. . |
| 1-115902 | 5/1989 | Japan . |
| 93/06802 | 4/1993 | WIPO . |
| 93/19769 | 10/1993 | WIPO . |

*Primary Examiner*—John Kight
*Assistant Examiner*—Everett White
*Attorney, Agent, or Firm*—Hamilton, Brook, Smith & Reynolds, P.C.

[57] ABSTRACT

A method for sterilizing solid hyaluronic acid includes autoclaving solid hyaluronic acid, whereby the solid hyaluronic acid is exposed to saturated steam at positive gauge pressure for a period of time that is sufficient to sterilize the solid hyaluronic acid. In one embodiment, autoclaving includes exposing the solid hyaluronic acid to saturated steam at a gauge pressure of about one atmosphere for a period of time between about fifteen and thirty minutes.

7 Claims, No Drawings

STEAM-STERILIZING SOLID HYALURONIC ACID

BACKGROUND OF THE INVENTION

Hyaluronic acid ("HA") is a naturally-occurring linear polysaccharide with repeating disaccharide units composed of gluconic acid and N-acetyl-glucosamine. As used herein, the term ,"HA," means hyaluronic acid and any of its hyaluronate salts.

HA is widely distributed in animal tissues; it is present in high concentrations in synovial fluid and the vitreous body of the eye, and in connective tissues of rooster comb, umbilical cord, and dermis. The molecular weight of hyaluronic acid isolated from natural sources generally falls within the range of about $6 \times 10^4$ to about $1.2 \times 10^7$ daltons. When implanted or injected into a living body, naturally-occurring HA has excellent biocompatibility and does not cause a foreign body reaction.

When used as a medical product, HA generally must be sterilized. A common method of sterilization is chemical sterilization. Chemical sterilization, however, can cause chemical contaminants to remain in the HA, thereby potentially limiting the utility of sterilized material.

Dry heating is another conventional method for sterilizing HA. Unlike chemical sterilization, dry heating results in little if any chemical contamination. Nonetheless, dry heating of HA degrades the HA by dramatically reducing its molecular weight and changes its conformational structure.

HA has also been sterilized in solution by autoclaving. Autoclaving of HA solution degrades the HA to a lesser extent, as measured by a decrease in molecular weight, than does dry heating. Nonetheless, the molecular weight loss remains significant; and the utility of the sterilized HA is thereby limited.

Therefore, a need exists for a method of sterilizing HA which overcomes or minimizes the above-mentioned problems.

SUMMARY OF THE INVENTION

The present invention relates to a method for sterilizing solid HA. The method includes steam-sterilizing solid HA.

This invention has many advantages. For example, the method does not leave chemical contaminants in the HA, such as can occur with chemical sterilization techniques. Also, the loss of molecular weight is substantially reduced as compared to the loss which typically results from dry heating HA or from autoclaving HA solution. Further, the required temperature and exposure period under this method are both less than the corresponding values generally required to sterilize solid HA by dry-heating.

DETAILED DESCRIPTION OF THE INVENTION

The features and other details of the apparatus and method of the invention will now be more particularly described and pointed out in the claims. It will be understood that the particular embodiments of the invention are shown by way of illustration and not as limitations of the invention. The principle features of this invention can be employed in various embodiments without departing from the scope of the invention.

The method of this invention includes sterilization of solid HA by autoclaving the solid HA. "Steam-sterilization," as that term is used herein, means sterilization by exposure to saturated or superheated steam at positive gauge pressure.

Suitable HA for sterilization by the method of the invention can be extracted from animal tissues or harvested as a product of bacterial fermentation. In one embodiment, HA can be produced in commercial quantities by bioprocess technology, as described, for example, in Nimrod et al., PCT Publication No. WO 86/04355, the teachings of which are incorporated herein by reference in their entirety. The solid form of HA can be precipitated from solution by a suitable organic solvent, such as ethanol, and subsequently dried. Typically, the HA precipitate is dried under vacuum at a temperature in a range of between about 4° C. and 40° C. for a period of time in a range of between about five minutes and twenty-four hours. It is to be understood that solid HA can be produced by other methods, such as by other methods known in the art.

The dried solid HA is then autoclaved to produce a sterile solid HA product. In one embodiment, the solid HA is steam-sterilized by directing the HA into an autoclave and exposing the solid HA to saturated steam at a temperature of at least about 121° C. and a gauge pressure of at least about one atmosphere for a period of time of at least about fifteen minutes. Preferably, the solid HA is steam-sterilized by exposing the solid HA to saturated steam at a temperature of at least about 126° C. and a gauge pressure of at least one atmosphere for a period of time of at least about fifteen minutes.

The invention will now be further and specifically described by the following example. All parts and percentages are by weight unless otherwise specified.

EXAMPLE

Batches of solid-state sodium hyaluronate of a molecular weight range of 1 M to 3 M daltons were collected from a solution of hyaluronic acid by ethanol precipitation and dried. The resulting HA solids were then autoclaved in separate batches at 126° C. and about 15 psig for 15, 20, 25, and 30 minutes. Batches of HA solution were also autoclaved under identical conditions. The molecular weight of both the HA solid and solution was measured before and after autoclaving.

Separate batches of HA solid were also dry-heated at 170° C. for one hour and at 140° C. for four hours. Some of the HA batches were inoculated with $10^7$ organisms of *Bacillus stearothermophilus*. After autoclaving, the sterility of the samples was checked and confirmed. All samples were sterilized under conditions of equivalent lethality.

The resulting data, shown below, demonstrated that heating the HA solid (precipitate) by dry air under sterilization conditions significantly degraded the HA:

| MW of HA Pre-heating | MW of HA solid Post-heating | Temperature (°C.) | Time (hr.) |
| --- | --- | --- | --- |
| 1,550,000 | 43,280 | 170 | 1 |
| 1,550,000 | 137,500 | 140 | 4 |
| 1,550,000 | 60,080 | 170 | 1 |
| 1,550,000 | 178,070 | 140 | 4 |

Additional resulting data, shown below, demonstrated the difference in molecular weight loss that resulted from autoclaving HA solution and autoclaving HA solid (precipitate):

| MW of HA Pre-autoclaving | MW of HA solution Post-autoclaving | MW of solid HA Post-autoclaving | Time (min.) |
| --- | --- | --- | --- |
| 2,769,500 | 1,639,000 | 2,439,800 | 20 |
| 1,797,200 | 1,212,800 | 1,872,900 | 15 |
| 2,132,000 | 1,438,800 | 2,012,300 | 15 |
| 2,769,500 | 1,438,000 | 2,495,200 | 25 |
| 2,769,500 | 1,261,300 | 2,464,300 | 30 |

The above-listed data demonstrated that HA solids sterilized by autoclaving (a) suffered significantly less degradation than did HA solids sterilized by dry heating and (b) suffered significantly less degradation than did HA solution sterilized by autoclaving.

EQUIVALENTS

Those skilled in the art will recognize, or be able to ascertain using no more than routine experimentation, many equivalents to specific embodiments of the invention described specifically herein. Such equivalents are intended to be encompassed in the scope of the following claims.

What is claimed is:

1. A method for sterilizing solid hyaluronic acid, comprising the step of steam-sterilizing the solid hyaluronic acid.

2. The method of claim 1, wherein said steam-sterilizing includes exposing the solid hyaluronic acid to saturated steam at a temperature of at least about 126° C. and a gauge pressure of about one atmosphere.

3. The method of claim 2, wherein said solid hyaluronic acid is steam-sterilized for a period of time of at least about fifteen minutes.

4. The method of claim 3, further including the step of precipitating said solid hyaluronic acid from a solution prior to steam-sterilizing the hyaluronic acid.

5. The method of claim 4, wherein the solid hyaluronic acid is precipitated from solution by adding ethanol to said solution.

6. The method of claim 5, further including the step of drying the precipitated solid hyaluronic acid prior to steam-sterilizing said hyaluronic acid.

7. The method of claim 1, wherein said steam-sterilizing includes exposing the solid hyaluronic acid to saturated steam at a temperature of at least about 121° C. and a gauge pressure of about one atmosphere for a period of time of at least about fifteen minutes.

* * * * *